United States Patent [11] 3,624,118

[72] Inventor Stelvio Papetti
Hamden, Conn.
[21] Appl. No. 130,433
[22] Filed Aug. 9, 1961
[45] Patented Nov. 30, 1971
[73] Assignee Olin Methieson Chemical Corporation

[54] REACTION PRODUCTS OF ALKALI METAL AMIDES AND TRIALKYL ALUMINUM COMPOUNDS
11 Claims, No Drawings
[52] U.S. Cl. .................................................. 260/448 A,
252/429 R, 260/93.7, 260/94.9 R
[51] Int. Cl. .................................................. C07f 5/06
[50] Field of Search ........................................ 260/448,
448 A

[56] References Cited
UNITED STATES PATENTS
3,048,612  8/1962  Walde ..................  260/448 A Primary Examiner—Leland A. Sebastian
Attorneys—Robert H. Bachman, Joseph Fleischer, Henry Prusaczyk, Paul E. Rochford, Richard S. Strickler, John D. Wilkins, Gordon D. Byrkit, Walter D. Hunter, Edward J. Mahler, Robert Alpher and George J. Koeser CLAIM: 1. Organo aluminum compounds of the formula:
M[$NH_2$ Al$R_3$]
Wherein M is an alkali metal and R is an alkyl group having one to eight carbon atoms.

REACTION PRODUCTS OF ALKALI METAL AMIDES AND TRIALKYL ALUMINUM COMPOUNDS

This invention relates to organo-aluminum compounds and to a method for their preparation. The novel compounds of this invention have the formula:

wherein M is an alkali metal and wherein R is an alkyl radical having one to eight carbon atoms.

In the process of this invention an alkali metal amide is reacted with a trialkyl aluminum compound according to the following equation:

wherein M and R have the same meaning as previously described. Preferably the reaction is conducted in the presence of an inert solvent which can be, for example, ammonia, or a lower dialkyl ether, such as diethyl ether, ethyl propyl ether, di-n-propyl ether, di-isopropyl ether, and di-n-butyl ether. The reaction temperature can be varied widely from about −30° C. to about +50° C. with the preferred reaction temperature being from about −10° C. to about +30° C. The reaction time will generally be from about 1 hour to 20 hours or more.

Lithium, potassium and sodium amides are suitable starting materials for use in the novel process described herein. These compounds can be prepared by methods well known to the art. For example, sodamide can be prepared in good yield by reacting sodium metal with liquid ammonia in the presence of a catalyst such as ferric nitrate.

Useful trialkyl aluminum compounds include trimethyl aluminum, triethyl aluminum, tri-n-propyl aluminum, tri-isopropyl aluminum, trihexyl aluminum, etc. The mixed trialkyl aluminum compounds, such as ethyl dimethyl aluminum, methyl dipropyl aluminum, and hexyl diheptyl aluminum are also suitable starting materials.

This invention is further illustrated but not limited by the following examples.

EXAMPLE I

A. Preparation of Sodamide

A quantity of sodamide was prepared by adding 6.5 grams (0.282 mole) of sodium metal with stirring to 100 ml. of liquid ammonia containing about 0.1 gram of ferric nitrate in a 300 ml., three-necked flask which was equipped with a magnetic stirrer, a dry ice condenser and a gas inlet tube. Dry air was bubbled through the reaction mixture during the first five minutes of the reaction. As soon as all of the sodium has been converted to the amide as evidenced by the disappearance of the blue color of the reaction mixture, the excess ammonia was evaporated off. Finally sodamide free of all trace of ammonia was obtained by heating the ammonia-containing product at 100° C. under high vacuum for three hours.

B. Preparation of Na[NH$_2$Al(CH$_3$)$_3$]

A graduated addition funnel to which there was attached a lecture bottle containing trimethyl aluminum was connected to the flask used in Part (A) for the preparation of sodamide. After 150 ml. of dry diethyl ether had been added to the reaction flask, it was purged with nitrogen and cooled to −78° C. A total of 27 ml. (0.282 mole) of trimethyl aluminum was admitted to the addition funnel from the lecture bottle and then added dropwise to the reaction flask. After the addition of the trimethyl aluminum, the temperature of the reaction mixture gradually rose to room temperature. As soon as all of the trimethyl aluminum had been added, the reaction mixture was refluxed for 9.5 hours. Filtration of the reaction mixture resulted in the recovery of a quantity of a black solid consisting of product contaminated with impurities which, after drying, at room temperature in vacuo weighed 8.8 grams (Fraction 1). The resulting filtrate was allowed to stand for about seven days at room temperature and then refiltered yielding, after drying, 3.5 grams of Na[NH$_2$Al(CH$_3$)$_3$], a white product, (Fraction 2). A third fraction (16.8 grams), representing a major portion of the product was obtained by evaporation of the ether solution.

The three fractions were analyzed for sodium, aluminum and nitrogen and the following results were obtained:

|  | Fraction 1 | | | Fraction 2 | | | Fraction 3 | | |
| --- | --- | --- | --- | --- | --- | --- | --- | --- | --- |
|  | Na | Al | N | Na | Al | N | Na | Al | N |
| Calculated for NaC$_3$H$_{11}$AlN | 20.72 | 24.32 | 12.61 | 20.72 | 24.32 | 12.61 | 20.72 | 24.32 | 12.61 |
| Found | 19.25 | 23.4 | 13.2 | 18.84 | 27.05 | 12.5 | 17.8 | 23.1 | |

EXAMPLE II

In this example the same apparatus as described in Example I was utilized. A total of 39.6 ml. (0.413) mole of trimethyl aluminum was added dropwise to 0.413 mole of sodamide (prepared as described in Part A of example I) at dry-ice temperature. After the addition of the trimethyl aluminum, the reaction mixture was allowed to warm up to about 0° C. The reaction mixture was then stirred for 6 hours and then filtered to recover a small amount of black material from the reaction mixture. The product, Na[NH$_2$Al(CH$_3$)$_3$], was obtained as a white powder by evaporation of the diethyl ether from the filtrate. After being washed first with 200 ml. of benzene and then with 200 ml. of pentane, the product was dried at room temperature under vacuum. The yield was 41.8 grams.

The Na[NH$_2$Al(CH$_3$)$_3$] so-obtained was analyzed for sodium, aluminum, nitrogen, hydrogen and carbon and the following results were obtained:

|  | Na | Al | N | H | C |
| --- | --- | --- | --- | --- | --- |
| Calcd. for NaC$_3$H$_{11}$AlN | 20.69 | 24.29 | 12.60 | 9.98 | 32.43 |
| Found | 18.4 | 24.3 | 10.91 | 9.91 | 32.17 |
|  | 18.7 | 24.5 | 11.06 | 10.00 | 32.24 |

EXAMPLE III

In this example 35.4 grams (0.907 mole) of commercial sodamide (a grayish powder) was added to a 1000 ml., three-necked round bottom flask which was equipped with a magnetic stirrer, a dry-ice condenser, a gas inlet tube, and an addition funnel. After 800 ml. of diethyl ether had been added to the flask, the flask and contents were cooled to −78° C. by means of a dry-ice acetone bath. In the next step 87.0 ml. of trimethyl aluminum was added dropwise with stirring from the addition funnel and the reaction mixture was allowed to warm up to room temperature. The reaction mixture was stirred for 4 hours and then filtered. Evaporation of the ether from the filtrate gave 82.5 grams of Na[NH$_2$Al(CH$_3$)$_3$], a white solid.

The product was analyzed and the following results were obtained:

|  | Na | Al | N | H | C |
| --- | --- | --- | --- | --- | --- |
| Calcd. for NaC$_3$H$_{11}$AlN | 20.69 | 24.29 | 12.60 | 9.98 | 32.43 |
| Found | 19.5 | 23.9 | 12.7 | 9.72 | 32.15 |
|  | 19.1 | 24.4 | 12.4 | 9.67 | 32.16 |

EXAMPLE IV

A. Preparation of Sodamide

A total of 0.42 mole of sodamide was prepared by adding 9.65 grams (0.42 mole) of sodium metal with stirring to 100 ml. of liquid ammonia containing about 0.1 gram of ferric nitrate in a 300 ml. three-necked flask equipped with a magnetic stirrer, a dry-ice condenser and a gas inlet tube. During the first 5 minutes of the reaction dry air was blown through the reaction mixture.

B. Preparation of Na[NH$_2$Al(C$_2$H$_5$)$_3$]

A graduated addition funnel was connected to the flask employed in Part (A). The flask containing the sodamide and the excess liquid ammonia was cooled to −78° C. by means of a dry-ice acetone bath. Then 57.6 ml. (0.42 mole) of triethyl aluminum was added dropwise with stirring to the flask from the addition funnel. The reaction mixture was allowed to warm up to the reflux temperature of ammonia and stirred for 5 hours. Under vacuum a total of 20.5 ml. of ammonia was removed from the reaction mixture over a period of about 1.0 hour leaving the Na[NH$_2$Al(C$_2$H$_5$)$_3$], a clear liquid, in the flask. The liquid so-obtained was centrifuged and decanted yielding about 68 ml. (62.6 grams) of product. Infrared analysis confirmed that the product was the desired Na[NH$_2$Al(C$_2$H$_5$)$_3$a[.

The novel compounds of this invention are useful as intermediates and, in addition, they can be employed as electrolytes where it is desired to electroplate other metals with very pure aluminum. The compounds of this invention are also useful as catalysts for the polymerization of olefins. The catalyst combination comprising triethyl aluminum or ethyl aluminum dichloride, titanium tetrachloride, and Na[NH$_2$Al(C$_2$H$_5$)$_3$] can be utilized to polymerize ethylene, propylene, butene, etc. at pressures of from about atmospheric to about 30,000 p.s.i.

What is claimed is:

1. Organo aluminum compounds of the formula:

$$M[NH_2AlR_3]$$

wherein M is an alkali metal and R is an alkyl group having one to eight carbon atoms.

2. Na[NH$_2$Al(CH$_3$)$_3$]

3. Na[NH$_2$Al(c$_2$H$_5$)$_3$]

4. A process for the preparation of organo aluminum compounds of the formula:

$$M[NH_2AlR_3],$$

wherein M is an alkali metal and R is an alkyl group having from one to eight carbon atoms which comprises reacting an alkali metal amide of the formula:

$$M NH_2,$$

wherein M is an alkali metal, with a trialkyl aluminum compound of the formula:

$$R_3Al$$

wherein R is an alkyl group having from one to eight carbon atoms.

5. The process of claim 4 wherein the reaction is carried out at temperatures of from about −30° C. to about +50° C.

6. A process for the preparation of Na[NH$_2$Al(CH$_3$)$_3$] which comprises reacting sodamide with trimethyl aluminum at a temperature of from about −30° C. to about +50° C.

7. The process of claim 6 wherein the reaction is carried out in the presence of an inert solvent.

8. The process of claim 6 wherein the reaction is carried out in the presence of diethyl ether.

9. A process for the preparation of Na[NH$_2$Al(C$_2$H$_5$)$_3$] which comprises reacting sodamide with triethyl aluminum at a temperature of from about −30° C. to about +50° C.

10. The process of claim 8 wherein the reaction is carried out in the presence of an inert solvent.

11. The process of claim 8 wherein the reaction is carried out in the presence of ammonia.

* * * * *